United States Patent [19]

Pelegrin

[11] Patent Number: 5,529,429
[45] Date of Patent: Jun. 25, 1996

[54] TRAFFIC CONTROL ASSEMBLY

[76] Inventor: Oscar D. Pelegrin, 16345 W. Dixie Hwy. Suite 202, North Miami Beach, Fla. 33160

[21] Appl. No.: 267,825

[22] Filed: Jun. 28, 1994

Related U.S. Application Data

[63] Continuation-in-part of Ser. No. 143,101, Oct. 29, 1993, abandoned.

[51] Int. Cl.$^6$ ................................................. E01F 9/012
[52] U.S. Cl. ........................................ 404/9; 116/63 C
[58] Field of Search ........................... 404/6, 9, 12, 13, 404/10; 116/63 P, 63 C; 190/114; 220/693

[56] References Cited

U.S. PATENT DOCUMENTS

| 2,275,711 | 3/1942 | Ybanez | 116/63 C |
|---|---|---|---|
| 2,333,273 | 1/1943 | Scanlon | 116/63 C |
| 2,753,077 | 7/1956 | Greco | 206/511 X |
| 2,954,005 | 9/1960 | Cioffi et al. | 116/63 C |
| 3,496,904 | 2/1970 | Rimkus | 116/63 C |
| 3,952,690 | 4/1976 | Rizzo et al. | 116/63 C X |
| 3,956,628 | 8/1971 | Wright | 116/63 C |
| 4,006,702 | 2/1977 | St. Cyr | 116/63 P |
| 4,256,050 | 3/1981 | Barnard | 116/63 C |
| 4,364,477 | 12/1982 | Stromberg | 206/511 |

FOREIGN PATENT DOCUMENTS

| 2090625 | 7/1982 | United Kingdom | 116/63 C |
|---|---|---|---|

*Primary Examiner*—Ramon S. Britts
*Assistant Examiner*—James A. Lisehura
*Attorney, Agent, or Firm*—Malloy & Malloy

[57] ABSTRACT

A collapsible traffic control assembly comprising a plurality of cylindrical segments selectively positionable relative to one another into a secured outwardly extending operative position or collapsed position wherein the segments are concentrically disposed within a housing. The housing of the assembly is adapted to allow a nesting stacked array of a plurality of such housings when the cylindrical segments associated therewith are disposed in their stored position.

20 Claims, 2 Drawing Sheets

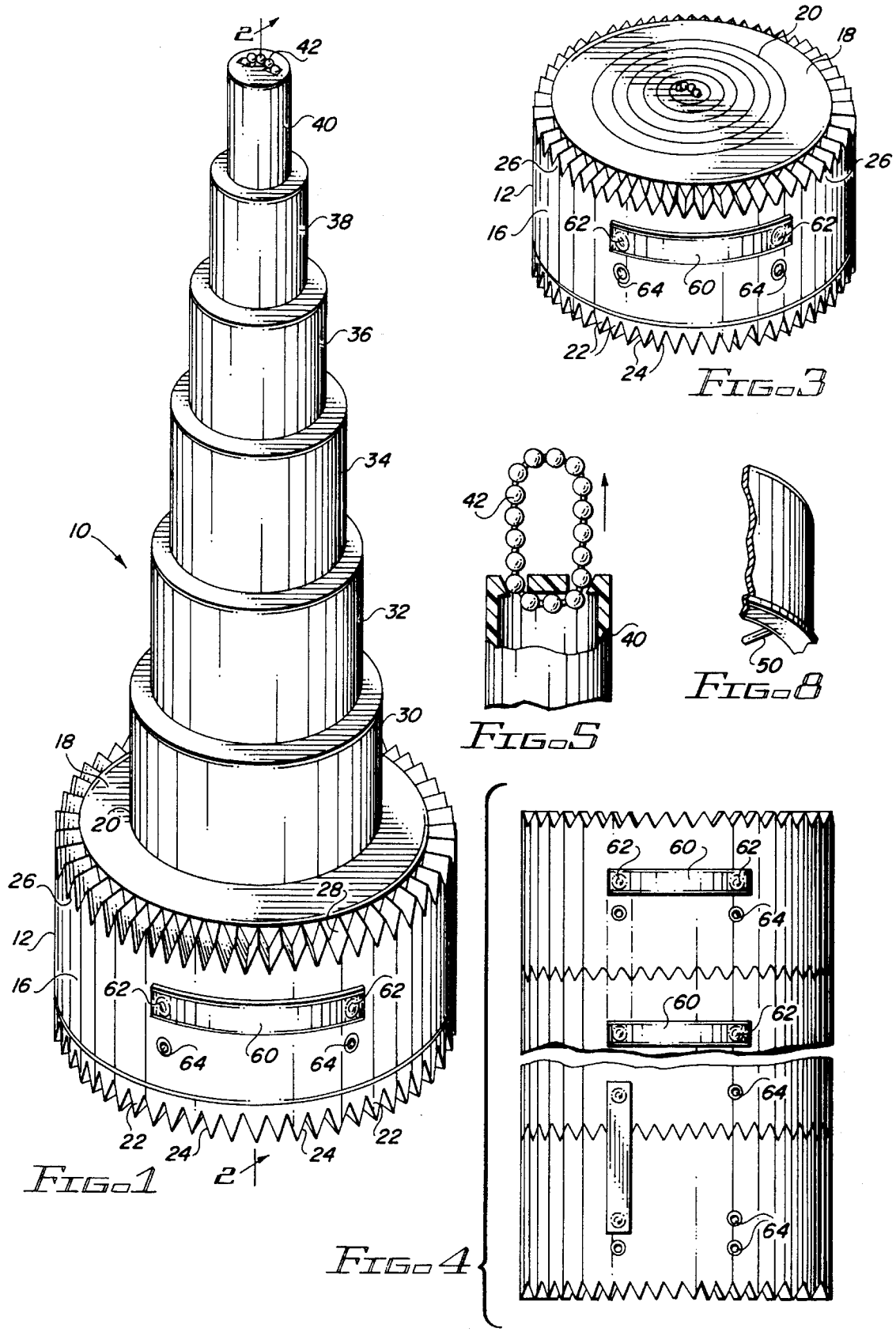

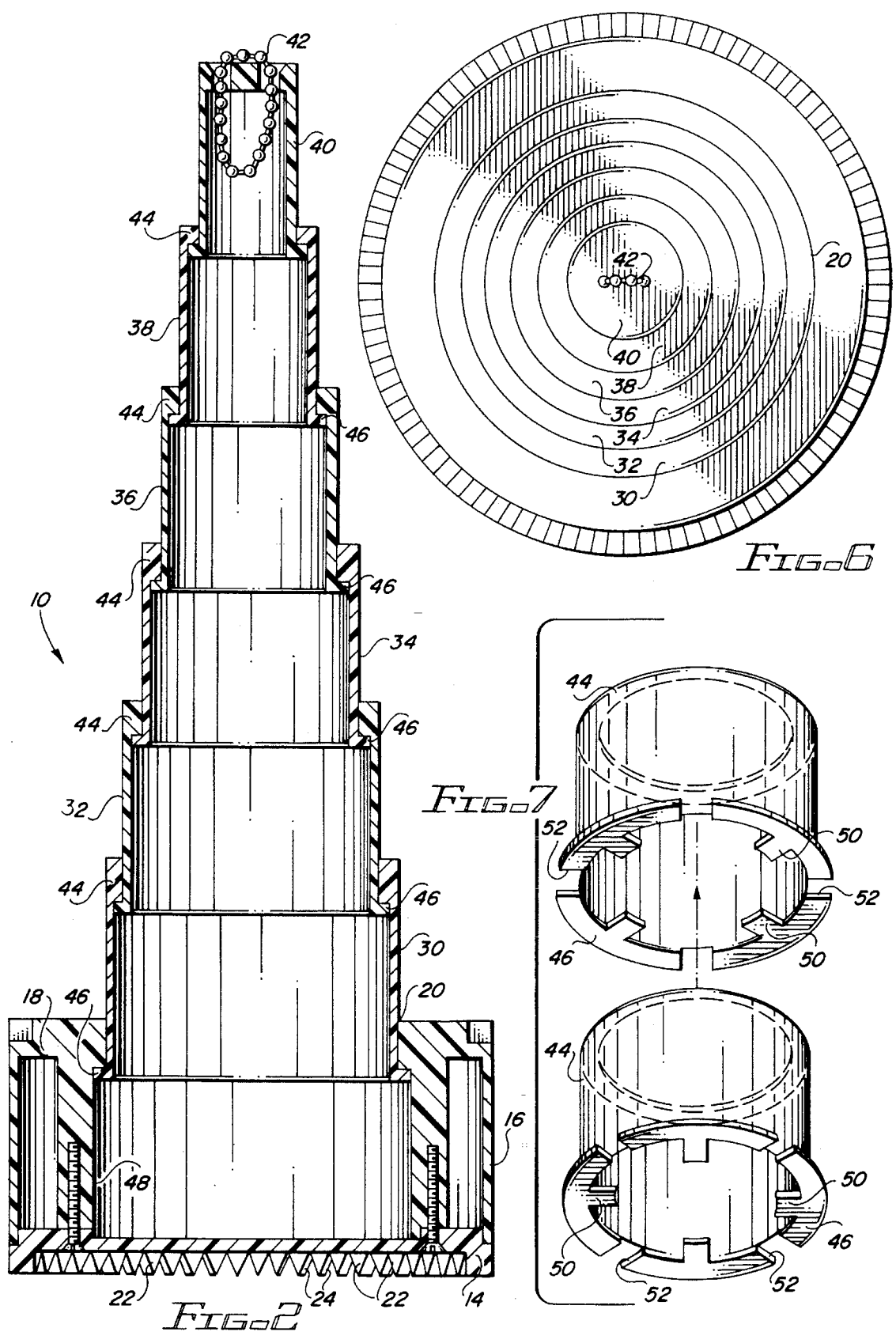

TRAFFIC CONTROL ASSEMBLY

This application is a continuation-in-part of application Ser. No. 08/143,101, filed Oct. 29, 1993, now abandoned.

BACKGROUND OF THE INVENTION

1. Field of the Invention

A traffic control assembly to be used in emergency road situations, comprising a plurality of frictionally but slidingly movable cylindrical segments selectively positionable in an outwardly extending operative position or in a collapsed stored position.

2. Description of the Related Art

The use of traffic cone markers in emergency traffic situations is well known for the purpose of warning oncoming traffic that a possible hazard exists. Prior art structures of such traffic markers were generally constructed of a flat base member and a rigid hollow conical body member formed of a number of different materials and generally being brightly colored to warn oncoming traffic or observers. The base member of these prior art devices conventionally includes a circular access opening for entry into the interior of the hollow body portion thereof so that a plurality of such traffic markers could be stacked to facilitate storage. Since these prior art markers are generally dimensioned to be between about two and three feet in height, and are not structured to be collapsible, only relatively minimal savings in space can be effected when large numbers of these cones are stacked for storage.

Accordingly, there is a recognized need for a traffic control assembly which is structured to be selectively positionable between a securely maintained outwardly extending operative position for warning oncoming traffic of a hazard, and a collapsed position of greatly reduced size to permit storage of a plurality of such traffic control assemblies in a relatively small space. In an attempt to satisfy this need, the prior art is generally representative of attempts to create a collapsible traffic marker structure which may be reduced in size for storage.

Expired U.S. Pat. No. 3,496,904 to Rimkus discloses a portable collapsible traffic marker comprising a base and a plurality of upwardly tapered, frusto-conical sleeves having decreasing cross-sections and which are telescopically connected to each other for forming an elongated extensible and collapsible cone-shaped guide. The Rimkus traffic marker is maintained in its extended condition by the frictional annular engagement of only the upper and lower marginal edges of adjacent sleeves, and is collapsed by depressing the top sleeve. Because of their frusto-conical shape, however, the sleeves will collapse freely once the frictional engagement of their adjacent upper and lower marginal edges is broken, which can occur by reason of continuous road vibrations caused by highway traffic. In addition, the Rimkus traffic marker includes a lowest sleeve having a base flange that is permanently joined to the base, which effectively forms a bottom closure for the hollow body of the marker. As a result, the size of the Rimkus traffic marker in its collapsed state is determined by the height of the lowest sleeve above the base, precluding economical storage of a plurality of such markers in a relatively small space. Finally, the Rimkus traffic marker does not include any type of limiting means for preventing overextension and consequent disengagement of the constituent sleeves.

Expired U.S. Pat. No. 4,006,702 to St. Cyr discloses a road buoy comprising a weighted base and a collapsible marker portion. In one embodiment of the St. Cyr road buoy, depicted in FIG. 9 of that patent, the collapsible marker portion is comprised of a series of truncated cones of progressively decreasing diameter and concentrically arranged. Each truncated cone has an outwardly disposed first lip on its bottom edge and an inwardly disposed second lip on its top edge, so that when the cones are telescopically extended, the upper and lower lips of adjacent cones come into stopping abutment and prevent overextension of the marker. The St. Cyr buoy is held in its extended position by the frictional contact of the upper and lower lip of each sleeve with the outer and inner marginal edges, respectively, of adjacent sleeves. Similar to the deficiency of the Rimkus traffic marker, however, the St. Cyr buoy, which includes a plurality of truncated cones of progressively decreasing diameter, lacks any structure to prevent the sleeves from collapsing freely once the frictional contact between the lips and the marginal edges of the sleeves is broken, as may inadvertently occur due to road vibration.

Thus, there is still a need in the art for a collapsible traffic control assembly which is structured to be selectively moveable between an operative outwardly extending position and a collapsed stored position within a housing, which includes means for preventing the assembly from freely collapsing without the exertion of a continuous downwardly directed force thereon, and in which the housing is specifically adapted to facilitate stacking of a plurality of such housings in a nested condition so as to permit the storage of a large number of such assemblies in a relatively small area.

SUMMARY OF THE INVENTION

The present invention relates to a collapsible traffic control assembly for use as a warning device in emergency road situations. The subject assembly includes a generally hollow housing having a bottom portion and a cover portion interconnected by a side wall portion. The assembly also includes a plurality of cylindrically-shaped segments of progressively decreasing diameter operably connected to one another. The cylindrical segments are moveable between a collapsed position in which they are disposed concentrically within the housing, and an operative position in which the segments extend upwardly and outwardly from the housing, with each of the segments extending outwardly from the adjacent segment of larger diameter. Each segment has a circumferential sidewall and includes an upper annular flange formed at the top end of its sidewall and extending radially inwardly therefrom, and a lower annular flange formed at the bottom end of its sidewall and extending radially outwardly therefrom. The upper flange of each segment frictionally and slidingly engages the outer surface of the adjacent segment of smaller diameter, while the lower flange of each segment frictionally and slidingly engages the inner surface of the adjacent segment of larger diameter. The upper and lower flanges also serve to limit the outward movement of each of the segments by coming into stopping abutment with one another when the segments are fully extended into their operative position. Each segment may also include a plurality of stop elements formed at its bottom end and which stoppingly engage the lower flange of the adjacent segment of smaller diameter when the segments are collapsed from their operative position to the stored position.

The housing of the present invention may include support means extending downwardly from a bottom surface of the base portion of the housing for supporting engagement with the ground or other surface on which the assembly is used. In addition, a nesting and stacked array feature may be provided in the structure of each housing by including a plurality of recesses in the cover portion of the housing which are structured and disposed to receive the support means of another of such housings therein in a removable but secure fashion. By virtue of this structural feature, a plurality of housings in their collapsed state may be nested into one another and disposed in a vertically stacked array for economical storage in a relatively small space.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the preferred embodiment of the traffic control assembly in its operative position.

FIG. 2 is a cross-sectional view of the assembly taken on line 2—2 of FIG. 1 and looking in the direction of the arrows.

FIG. 3 is a perspective view of the preferred embodiment of the assembly in its collapsed position.

FIG. 4 is a perspective view of three housings nested into one another in a vertically stacked array.

FIG. 5 is a partial front cross-sectional view of the smallest diameter segment of the assembly.

FIG. 6 is a top view of the assembly.

FIG. 7 is an exploded view in cross-section of two adjacent cylindrical segments prior to their assembly, with the arrow indicating that the segment of smaller diameter passes upwardly through the adjacent segment of larger diameter during assembly.

FIG. 8 illustrates a portion of a cylindrical segment as shown in FIG. 7, but having an alternative embodiment of the stop elements 50.

Like reference numerals refer to like parts throughout the several views of the drawings.

DETAILED DESCRIPTION OF THE PREFERRED EMBODIMENT

Referring now to the drawings, the subject assembly is generally indicated as 10 and includes a generally hollow housing 12 having a base portion 14 and a surrounding side wall portion 16. Preferably, base portion 14 will be securely yet removably attachable to side wall portion 16. As shown in FIGS. 1–3, housing 12 further includes a cover portion 18 disposed in overlying relation to side wall portion 16. In the preferred embodiment of the invention, housing 12 will have a substantially cylindrical shape, although it will be appreciated that housing 12 may comprise any suitable configuration such as square base and cover portions and four rectangular side wall portions. A central access opening 20 defined by a circular flange within cover portion 18 is specifically dimensioned and configured to allow passage therethrough of a cylindrical segment of largest diameter in frictional but sliding engagement with the circular flange, as described below.

Housing 12 will preferably include a support means for supporting assembly 10 above the ground or other vertical surface. In the preferred embodiment, the support means comprises a plurality of contact elements 22 of generally triangular cross-section extending downwardly from a lower surface of base portion 14. Contact elements 22 are disposed in spaced relation around an outer periphery of the lower surface of base portion 14 so as to define a plurality of correspondingly shaped but inverted recesses 24 between contact elements 22. The unique configuration and disposition of contact elements 22 provides for an extremely stable support of assembly 10 on the ground, which may be of a rough texture and often contains cracks and crevices. Preferably, there is also formed in cover portion 18 a plurality of mating elements 26 and receiving spaces 28 which are correspondingly configured and disposed to matingly engage contact elements 22 and recesses 24 of another assembly, and to permit two or more housings to be partially nested within one another and placed in a vertically stacked array, as illustrated in FIG. 4, when the assemblies are in their collapsed position as described herein.

In an alternative embodiment, the support means may comprise a plurality of legs extending downwardly from the lower surface of base portion 14. Preferably, there will be four legs of any desired length, for example, approximately one to three inches depending upon the overall size of housing 12. Housing 12 may further include a plurality of depressions formed in cover portion 18 which are structured and disposed to have removably received therein the legs from another housing. Again, by virtue of this construction, two or more of such housings may be partially nested within one another and mounted in a stacked vertical array, with the legs of each housing disposed in mating engagement within the depressions of the lower adjacent housing.

As illustrated in FIGS. 1 and 2, assembly 10 includes a plurality of cylindrically-shaped segments, each having a circumferential sidewall. For purposes of clarity, the cylindrical segments are individually numbered outwardly from a base segment of largest diameter as segments 30, 32, 34, 36, 38, and 40, representing the segment of smallest diameter. The segments are collectively moveable frictionally but slidingly from a collapsed position shown in FIG. 3 in which the segments are disposed concentrically within housing 12, to an operative position shown in FIGS. 1 and 2 in which the segments extend upwardly and outwardly from housing 12, with each segment extending outwardly from the adjacent segment of larger diameter. There is attached to segment 40 a collapsible means for collectively lifting and extending the segments to their operative position, which in the preferred embodiment comprises a small rope and ball chain 42, although those skilled in the art will recognize that any suitable lifting means or handle may be used instead.

As shown in FIG. 2, each segment, with the exception of segment 40, includes an upper annular flange 44 formed at the top end thereof and extending radially inwardly substantially perpendicular to the sidewall of the segment. Upper flange 44 is structured and dimensioned to frictionally yet slidingly engage the outer surface of the adjacent segment of smaller diameter. In addition, each segment includes a lower annular flange 46 formed at the bottom end thereof and extending radially outwardly substantially perpendicular to the sidewall of the segment. Lower flange 46 is structured and dimensioned to frictionally yet slidingly engage the inner surface of the adjacent segment of larger diameter. Because each segment has a cylindrical shape, in contrast to the truncated cone-shaped sleeves of the prior art traffic markers, the upper and lower flanges of each segment maintain a continuous frictional engagement with the outer and inner sidewall surfaces of the adjacent segments along the entire lengths thereof. It will be recognized that this continuous frictional engagement provides a more secure means of maintaining the segments in their outwardly extended operative position and preventing their inadvertent collapse due to incessant road vibration from traffic. In order to move the segments into their collapsed position, a constant downwardly directed force must be exerted against them to overcome the force of friction existing between the upper and lower flanges of each segment and the entire lengths of the inner and outer sidewall surfaces of adjacent segments.

Upper 44 and lower 46 flanges of each segment also function as a limiting means to limit the outer extension or travel of each of the segments relative to its adjacent segment. When the segments are collectively fully extended, as seen in FIG. 2, lower flange 46 of each segment comes into stopping abutment with upper flange 44 of the adjacent segment of larger diameter, thereby preventing overextension of assembly 10.

Housing 12 preferably includes an annular seating sleeve 48 disposed in coaxial alignment with access opening 20 and extending downwardly from the lower surface of cover portion 18. There is also provided on the upper surface of base portion 14 a recessed circular track (not shown) structured to matingly receive therein the lower edge of seating sleeve 48. In the collapsed position, segment 30 of largest diameter is disposed within and adjacent to seating sleeve 48, with lower flange 46 of segment 30 in frictional and sliding engagement with the inner surface of seating sleeve 48 and the other segments disposed concentrically within segment 30 and seating sleeve 48. When the segments are extended into their operative position, lower flange 46 of segment 30 comes into stopping abutment with the lower surface of cover portion 18, preventing segment 30 from becoming detached from housing 12. For additional stability of assembly 10, there may be included within housing 12 a weighted annular member which is positioned between seating sleeve 48 and side wall portion 16.

Referring to FIG. 7, in the preferred embodiment of the present invention each segment, with the exception of segment 40 of smallest diameter, may include a plurality of stop elements formed at its bottom end. The stop elements stoppingly engage lower flange 46 of the adjacent segment of smaller diameter when the segments are moved from their operative position to their collapsed position and prevent any of the segments from falling through the adjacent segment of larger diameter and into housing 12 when a downwardly directed force is exerted on segment 40. Preferably, each of the stop elements comprises a generally flat tab member 50 extending radially inwardly and disposed in substantially co-planar relation to lower flange 46. Those skilled in the art will appreciate, however, that the stop elements may comprise any suitable configuration such as thin pin-like members as shown in FIG. 8. In a preferred embodiment, tab members 50 will also be sized and structured to frictionally and slidingly engage the outer surface of an adjacent segment of smaller diameter and to maintain that segment in alignment, during assembly of the invention when segments of smaller diameter are passed upwardly through adjacent segments of larger diameter, as shown in FIG. 7 and described below.

In order to assemble the present invention, there will also be provided a plurality of cut-outs 52 in the lower flange 46 of each segment except segment 30 of largest diameter. Cut-outs 52 are structured and disposed to allow passage therethrough of tab members 50 of the adjacent segment of larger diameter when a segment of smaller diameter is passed upwardly through that adjacent segment of larger diameter, as illustrated in FIG. 7, provided that the cut-outs 52 and tab members 50 have been appropriately aligned with one another. After the invention has been assembled, each segment is partially rotated so as to misalign tab members 50 and cut-outs 52 of adjacent segments, thereby enabling the tab members 50 to stoppingly engage lower flange 46 of the adjacent segment of smaller diameter when the segments are moved from their operative position to their collapsed position. As seen in FIG. 2, each segment of increased diameter preferably includes an upper flange 44 of progressively increased thickness, to take into account the presence of tab members 50 on each segment and to allow the segments to collectively reside in their collapsed position with their upper surfaces in substantially co-planar relation to cover portion 18.

As illustrated in FIGS. 1, 3 and 4, removable multipurpose straps 60 with female button-type snaps 62 may be provided on different sides of housing 12 by attachment to male snap members 64 for access to carry, lift, interlock, or move one or a plurality of housings in their collapsed state, nested into one another, in a vertically stacked array. In a preferred embodiment, multi-purpose strap 60 is attached in a central location on housing 12 in a horizontal disposition and preferably would be sized about four or five inches in length and about one inch in width. In a typical use of strap 60, one female snap 62 of strap 60 is removed from its male snap member 64, and strap 60 is rotated upwardly to a vertical orientation for attachment of unattached female snap 62 to a male snap member 64 of the next upper housing. In an alternative embodiment, elongate recesses, not shown, may be provided on opposing sides of housing 12 for finger access to lift or move it. These recesses would be centrally located and preferably extend horizontally about four and one half inches and vertically about one inch for finger gripping access.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A collapsible traffic control assembly comprising:

(a) a plurality of cylindrical segments of progressively decreasing diameters, said plurality of segments being operably connected together in coaxial relation to one another, (b) each of said cylindrical segments having a circumferential sidewall, an inner surface, an outer surface, an upper annular flange formed at a top end of said sidewall and extending radially inwardly substantially perpendicular to said sidewall, and a lower annular flange formed at a bottom end of said sidewall and extending radially outwardly substantially perpendicular to said sidewall, (c) each of said lower flanges being structured and dimensioned to frictionally and slidingly engage said inner surface of an adjacent segment of larger diameter, along an entire length thereof each of said upper flanges being structured and dimensioned to frictionally and slidingly engage said outer surface of an adjacent segment of smaller diameter, along an entire length thereof, (d) a housing for containing and supporting said plurality of segments, said housing having a base portion, a cover portion, a sidewall portion, and a cavity therein, said cover portion being integral with said sidewall portion and including an inner flange defining a generally circular access opening, said access opening in said cover portion being structured and dimensioned to allow passage therethrough of a largest diameter segment in frictional and sliding engagement with said inner flange;

(e) said plurality of segments being collectively moveable frictionally but slidingly between a collapsed position wherein said plurality of segments are disposed concentrically substantially within said housing cavity, and an operative position wherein said plurality of segments extend upwardly and outwardly from a top of said housing with said lower annular flange of each of said segments being disposed in abutting contact with said upper flange of said adjacent segment of larger diameter.

2. A collapsible traffic control assembly as recited in claim 1 wherein said housing includes an annular seating sleeve formed therein, said seating sleeve extending downwardly from a lower surface of said cover portion.

3. A collapsible traffic control assembly as recited in claim 2 wherein said seating sleeve is disposed in coaxial relation with said access opening, said seating sleeve including an inner surface structured and dimensioned to frictionally and slidingly engage said lower annular flange of said largest diameter segment.

4. A collapsible traffic control assembly as recited in claim 3 further comprising a generally annular weighted member disposed within said housing cavity, said annular member being between said seating sleeve and said housing sidewall portion.

5. A collapsible traffic control assembly as recited in claim 1 wherein said housing includes means for supporting said assembly above a surface.

6. A collapsible traffic control assembly as recited in claim 5 wherein said support means comprises a plurality of vertical leg members extending downwardly from a lower surface of said base portion.

7. A collapsible traffic control assembly as recited in claim 6 further comprising a plurality of depressions formed in said cover portion, said plurality of depressions being structured and disposed to removably receive therein in mating engagement a plurality of leg members from a housing of another assembly.

8. A collapsible traffic control assembly as recited in claim 5 wherein said support means comprises a plurality of contact elements disposed in spaced relation around an outer periphery of said base portion and defining a plurality of recesses between said contact elements.

9. A collapsible traffic control assembly as recited in claim 8 wherein each of said contact elements has a generally triangular cross-section and each of said recesses has a correspondingly shaped but inverted triangular cross-section.

10. A collapsible traffic control assembly as recited in claim 9 further comprising a plurality of mating elements and receiving spaces in said cover portion, said plurality of mating elements and receiving spaces being structured and disposed to matingly engage a plurality of contact elements and recesses of another housing said plurality of mating elements and receiving spaces in said cover portion disposed about a perimeter of said cover portion generally adjacent said sidewall portion and defining a back wall within said cover portion encircling an inner region abutting said plurality of mating elements and receiving spaces.

11. A collapsible traffic control assembly as recited in claim 10 wherein said housing has a generally cylindrical shape.

12. A collapsible traffic control assembly as recited in claim 1 further comprising a plurality of stop elements formed in spaced relation on each of said segments, said plurality of stop elements being structured and disposed to engage said lower flange of said adjacent segment of smaller diameter upon movement of said plurality of segments from said operative position to said collapsed position.

13. A collapsible traffic control assembly as recited in claim 12 wherein said stop elements are structured and dimensioned to frictionally and slidingly engage an outer surface of an adjacent segment of smaller diameter.

14. A collapsible traffic control assembly as recited in claim 12 wherein each of said stop elements comprises a substantially flat tab member formed at a bottom end of said segment sidewall and extending radially inwardly therefrom, said tab member being disposed in substantially co-planar relation to said lower flange of said segment.

15. A collapsible traffic control assembly as recited in claim 12 wherein each of said stop elements comprises a generally thin pin member inserted at a bottom end of said segment sidewall and extending radially inwardly therefrom, said pin member being disposed in substantially co-planar relation to said lower flange of said segment.

16. A collapsible traffic control assembly as recited in claim 12 wherein said upper flanges of said plurality of segments are structured and dimensioned so as to dispose upper surfaces of said segments in substantially co-planar relation to said cover portion when said assembly is disposed in said collapsed position.

17. A collapsible traffic control assembly as recited in claim 1 further comprising lifting means for extending said plurality of segments from said collapsed position to said operative position.

18. A collapsible traffic control assembly as recited in claim 17 wherein said lifting means is operably connected to a segment of smallest diameter and is collapsible therein.

19. A collapsible traffic control assembly comprising:

(a) a plurality of cylindrical segments of progressively decreasing diameters, said plurality of segments being operably connected together in coaxial relation to one another, (b) each of said cylindrical segments having a circumferential sidewall, an inner surface, an outer surface, an upper annular flange formed at a top end of said sidewall and extending radially inwardly substantially perpendicular to said sidewall, and a lower annular flange formed at a bottom end of said sidewall and extending radially outwardly substantially perpendicular to said sidewall, (c) each of said lower flanges being structured and dimensioned to frictionally and slidingly engage said inner surface of an adjacent segment of larger diameter, each of said upper flanges being structured and dimensioned to frictionally and slidingly engage said outer surface of an adjacent segment of smaller diameter, (d) a housing for containing and supporting said plurality of segments, said housing having a base portion, a cover portion, a sidewall portion, and a cavity therein, said cover portion including an inner flange defining a generally circular access opening, said access opening being structured and dimensioned to allow passage therethrough of a largest diameter segment in frictional and sliding engagement with said inner flange;

(e) said plurality of segments being collectively moveable frictionally but slidingly between a collapsed position wherein said plurality of segments are disposed concentrically substantially within said housing cavity, and an operative position wherein said plurality of segments extend upwardly and outwardly from said housing with said lower annular flange of each of said segments being disposed in abutting contact with said upper flange of said adjacent segment of larger diameter;

(f) a plurality of stop elements formed in spaced relation on each of said segments, said plurality of stop elements being structured and disposed to engage said lower flange of said adjacent segment of smaller diameter upon movement of said plurality of segments from said operative position to said collapsed position; and (g) each of said segments including a plurality of cut-outs in said lower flange, said plurality of cut-outs being structured and disposed to allow passage therethrough of said plurality of stop elements of said adjacent segment of larger diameter.

20. A collapsible traffic control assembly comprising:

(a) a plurality of cylindrical segments of progressively decreasing diameters, said plurality of segments being operably connected together in coaxial relation to one another, (b) each of said cylindrical segments having a circumferential sidewall, an inner surface, an outer surface, an upper annular flange formed at a top end of said sidewall and extending radially inwardly substantially perpendicular to said sidewall, and a lower annular flange formed at a bottom end of said sidewall and extending radially outwardly substantially perpendicular to said sidewall, (c) each of said lower flanges being structured and dimensioned to frictionally and slidingly engage said inner surface of an adjacent segment of larger diameter, each of said upper flanges being structured and dimensioned to frictionally and slidingly engage said outer surface of an adjacent segment of smaller diameter, (d) a housing for containing and supporting said plurality of segments, said housing having a base portion, a cover portion, a sidewall portion, and a cavity therein, said cover portion including an inner flange defining a generally circular access opening, said access opening being structured and dimensioned to allow passage therethrough of a largest diameter segment in frictional and sliding engagement with said inner flange;

(e) said plurality of segments being collectively moveable frictionally but slidingly between a collapsed position wherein said plurality of segments are disposed concentrically substantially within said housing cavity, and an operative position wherein said plurality of segments extend upwardly and outwardly from said housing with said lower annular flange of each of said segments being disposed in abutting contact with said upper flange of said adjacent segment of larger diameter; and (f) a removable strap having a female snap element at opposite ends thereof and a plurality of male snap members disposed in an outer surface of said housing sidewall, each of said female snap elements being structured to matingly receive therein one of said plurality of male snap members, said strap being attachable to said sidewall outer surface by mating engagement of at least one of said female button snaps with one of said plurality of male snap members.

* * * * *